US007031133B2

(12) United States Patent
Riebel et al.

(10) Patent No.: US 7,031,133 B2

(45) Date of Patent: Apr. 18, 2006

(54) AEROSOL CHARGE ALTERING DEVICE

(76) Inventors: Ulrich Riebel, Dorfstr. 35, 03096 Briesen (DE); Yves G. Stommel, Gulbener Str. 18, 03046 Cottbus (DE)

( * ) Notice: Subject to any disclaimer, the term of this patent is extended or adjusted under 35 U.S.C. 154(b) by 0 days.

(21) Appl. No.: 10/966,867

(22) Filed: Oct. 15, 2004

(65) Prior Publication Data

US 2005/0083633 A1 Apr. 21, 2005

(30) Foreign Application Priority Data

Oct. 16, 2003 (DE) ................................ 103 48 217

(51) Int. Cl.
*H02H 1/00* (2006.01)

(52) U.S. Cl. ...................................................... 361/212

(58) Field of Classification Search ................ 361/212, 361/213, 220, 225, 226, 227, 228, 230, 231
See application file for complete search history.

(56) References Cited

U.S. PATENT DOCUMENTS

| | | | | |
|---|---|---|---|---|
| 4,417,293 | A * | 11/1983 | Larigaldie | 361/212 |
| 4,617,483 | A * | 10/1986 | Marks | 310/10 |
| 4,837,440 | A * | 6/1989 | Burtscher et al. | 250/379 |
| 5,214,386 | A * | 5/1993 | Singer et al. | 324/452 |
| 5,504,563 | A * | 4/1996 | Hays | 399/284 |
| 5,973,904 | A * | 10/1999 | Pui et al. | 361/225 |
| 6,145,391 | A * | 11/2000 | Pui et al. | 73/865.5 |
| 6,482,253 | B1 * | 11/2002 | Dunn | 96/62 |

* cited by examiner

*Primary Examiner*—Ronald Leja
(74) *Attorney, Agent, or Firm*—Larkin Hoffman Daly & Lindgren Ltd.; Frederick W. Niebuhr

(57) ABSTRACT

The invention relates to a device for charging or adjusting the charge of gas-borne particles into a defined charge distribution under utilization of corona discharge in the aerosol space. In addition to an appropriate geometry of the charger and the electrodes, the voltage waveform and the voltage regulation are of great significance for the result. The application further relates to a method for operating the device.

53 Claims, 11 Drawing Sheets

AEROSOL CHARGE ALTERING DEVICE

BACKGROUND OF THE INVENTION

The invention relates to a device and a method for charging or charge reversing an aerosol into a defined charge state of a bipolar diffusion charging (e.g. symmetrical or equilibrium charge distribution according to Fuchs, N., On the Stationary Charge Distribution on Aerosol Particles in a Bipolar Ionic Atmosphere, Geofis. Pura Appl., Vol. 56, 1963, pp. 185–192) with the aid of an electrical discharge in the aerosol space.

Alternatively, the device and method are suitable for setting a defined unipolar charge state of the aerosol.

Technical aerosols in industry and research often exhibit a medium to high electrical charge. Neutralization enables the production of aerosols of a defined charge state. Above all in research and in aerosol measurement technology involving instruments such as a differential mobility analyzer (DMA), neutralization can be an indispensable prerequisite. In addition, with the aid of neutralization the probability of electrical discharges or dust explosions is reduced, and any tendency for particle deposition in pipes and equipment parts is counteracted.

Known methods for aerosol neutralization employ radioactive sources or corona discharge sources.

Radioactive sources, by virtue of radioactive decay, produce ionizing radiation which produces equal quantities of anions and cations in the aerosol space. The gas ions subsequently charge or reverse the charge as the case may be, altering the aerosol into the theoretically describable charge state of the bipolar diffusion charge (cf. Fuchs, N., On the Stationary Charge Distribution on Aerosol Particles in a Bipolar Ionic Atmosphere, Geofis. Pura Appl., Vol. 56, 1963, pp. 185–192).

The application of radioactive sources, aside from safety concerns, is very simple. In the case of a suitable arrangement, an adjustment or readjustment need not be carried out. To be sure, the application field of radioactive sources is limited by several disadvantages:

- The safety requirements concerning the radioactive source are high.
- The neutralization into the equilibrium state (as described in Fuchs) is practical only for small aerosol volume streams (<150 l/min), low aerosol concentrations, and low initial charges.
- The costs are very high.

Neutralizations on the basis of the corona discharge are in principle capable of handling greater aerosol volume streams, higher aerosol concentrations, and higher initial charges of the aerosol.

Romay et al. (Romay, F., Liu, B., Pui, D., A Sonic Jet Corona Ionizer for Electrostatic Discharge and Aerosol Neutralization, Aerosol Sci. Tech., Vol. 20, 1994, pp. 31–41) speaks of three problems in neutralization with corona discharges:

- Unequal production rates of positive and negative ions.
- Ozone generation.
- Particle production through sputtering or chemical reactions.

Previous devices have avoided producing the corona discharge in the aerosol space itself. An electric field required to produce the corona discharge in the aerosol space causes partial precipitation of the aerosol, and the particles are not charged into the desired charge state of diffusion-based bipolar charging.

This problem can be solved through producing the necessary ions of both polarities in one or several separate process spaces. Then, with the aid of a particle-free carrier gas, the ions are introduced into the field-free aerosol space (e.g. Romay, F., Liu, B., Pui, D., A Sonic Jet Corona Ionizer for Electrostatic Discharge and Aerosol Neutralization, Aerosol Sci. Tech., Vol. 20, 1994, pp. 31–41; Zamorani, E., Ottobrini, G., Aerosol Particle Neutralization to Boltzmann's Equilibrium by AC Corona Discharge, J. Aerosol Sci., Vol. 9, pp. 31–39; Adachi, M., Pui, D., Liu, B., Aerosol Charge Neutralization by a Corona Ionizer, Aerosol Sci. Tech., Vol. 18, 1993, pp. 48–58). This dilutes the aerosol. In addition, most of the gas ions are deposited onto the walls or are lost through recombination. The resulting need to overproduce the gas ions increases the ozone yield.

Devices that operate directly in the aerosol space with electric discharges were developed by Hinds, W., Kennedy, N., An Ion Generator for Neutralizing Concentrated Aerosols, Aerosol Sci. Tech., Vol. 22, 2000, pp. 214–220 and Gutsch, A., Agglomeration feinster gasgetragener Partikel unter dem Einfluss elektrischer Kräfte [Agglomeration of Superfine Gas-borne Particles under the Influence of Electrical Forces], Dissertation, University Fridericiana Karlsruhe, 1995.

Gutsch uses an arrangement with two points opposite each other in a channel that accommodates an aerosol flow. A constant positive or negative high voltage, as the case may be, is temporarily applied to each of the two points. A bipolar corona discharge is generated between the two points. Both points act as active electrodes and produce positive or negative gas ions, as the case may be.

Hinds developed an apparatus with a total of five electrodes, including a central electrode and four points aligned axially in the flow in a 90° arrangement. The four points are biased to the same potential, while the axial electrode forms the antipole (in this case positive). Due to smaller curvature radii of the four electrodes, more negative than positive charges develop. The precise ratio of the positive and negative charge magnitudes is controlled through the electrode radii and the voltage.

However, the methods using discharging in the aerosol space achieve only a charge reduction (Hinds) or charging to an undefined bipolar charge state (Gutsch). Neither device can be shown to charge or reverse charge the aerosol into the diffusion-based bipolar charge distribution. In addition, considerable deposition occurs.

The object of the invention is to create a method whereby gas ions are produced directly in the aerosol space with the aid of electric discharges such that the aerosol attains the diffusion-based, bipolar charge distribution. The device for this purpose should favorably realize the advantages of the described method. Diffusion separation or separation through electrical forces should be avoided to the extent possible, and charging into the diffusion-based equilibrium state should occur despite the presence of an electric field.

SUMMARY OF THE INVENTION

The achieving of the object results from the combination of features of claim 1. Preferable embodiments result from the dependent claims.

In the present invention, the known principles of action of the corona discharge and diffusion and field charging are realized in a new and effective manner.

According to the invention, the specified objects are accomplished through a favorable voltage management, electrode design, and geometry of an electrical neutralizer.

An alternating voltage is produced between active and passive electrodes, to cause a corona discharge at one or more active electrodes. In the bipolar operating mode, the alternating voltage produces alternately positive and negative gas ions, which subsequently penetrate into and traverse the gap between the active and passive electrodes. The gap represents an aerosol space through which the aerosol flows.

Especially advantageous is the use of high-frequency alternating voltage in the frequency region above 100 Hz. Tests previously carried out show very good results at frequencies between 1 and 6 kHz, and suggest that higher and lower frequencies also provide satisfactory results.

Due to the short period length, charged aerosol particles can travel only a very short distance during one period, so that the deposition of the aerosol is kept very low.

In the case of an alternating-voltage discharge, each active electrode produces alternately positive and negative ions. Thus, besides electrode arrangements having two or more active electrodes, arrangements having only one active electrode are possible. FIG. 1 shows such an arrangement, in which the point (needle) acts as the active electrode and the ring as the passive electrode.

In order to emulate as well as possible the action of radioactive sources in the aerosol neutralization, positive and negative ions should be generated in equal concentrations. To ensure this, the different current-voltage characteristics of the positive and negative corona discharge must be taken into consideration. To this end, the invention provides several possibilities:

- A static (constant) bias voltage applied between the electrodes or to one of the electrodes, superimposed upon the applied alternating voltage.
- An asymmetrical alternating voltage, where either the amplitudes or the durations of the positive and negative half-waves (or both values) are differently set.
- Measuring the temporal mean value $\bar{I}$ of the current flowing through the active electrode and setting it to the null value, while the temporal mean potential of the active or the passive electrode is correspondingly regulated.
- Connection of the active electrode via a capacitor to ground potential. Since the capacitor lets no current pass in the temporal mean, the potential of the active electrode, after a short startup phase, adjusts itself so that $\bar{I}=0$. Typical values of this potential are up to a few hundred volts (as compared to alternating voltages in the range of several kV), so that in a practical realization, non-negligible currents can flow through the capacitor. These current losses can, according to the invention, be reduced through coupling the capacitor to a constant or a readjusted bias voltage rather than ground.
- Two active electrodes, operated at opposite polarities of the corona discharge and coupled directly to each other, so that in each case the same amount of positive and negative charge carriers are formed.

The residence time of the aerosol in the electrical neutralizer is very short, with values between 0.1 and 5 seconds, resulting in negligibly small diffusion losses and agglomeration influences. Consequently, the particle concentration and size distribution of the aerosol are maintained.

By means of a favorable geometry of the neutralizer and, above all, of the electrodes, the range of higher field strengths can be minimized. Represented in FIG. 1 is a possible electrode arrangement in which a strong electric field is present only between the point and the outer electrode ring. The field quickly diminishes in the flow direction.

The rapidly-weakening field enhances the aerosol penetration through the electrical neutralizer. Also, the high frequency of the alternating voltage, through a continuous directional change of the electrical field, reduces particle deposition through electric forces.

Through the rapid diminishing of the electric field strength outside of the corona discharge zone, the field charging mechanism quickly loses influence and the diffusion charging mechanism gains in importance. The frequency of the fluctuating electric and ionic field remains constant with increasing distance from the electrodes, while the field strength and ion concentration decrease. Thus, the rate of charging and charge reversing of the individual particles also decreases.

The integration of the electric discharge into the aerosol space has the advantage that the ions need not be transported to the aerosol by means of a complex mechanism. Above all, the frequently-observed large losses of ions through recombination and wall deposition on the course from the ion producer to the aerosol space are prevented. The result is a far more effective use of the ions produced. The efficient utilization of the current makes it possible to achieve the neutralized charge state with a low current strength and thus a low discharge intensity and ozone production.

The selection of the voltage waveform plays a fundamental role in the ratio of the field charging to the total charging. Thus, the voltage waveform represented in FIG. 2*b* results in a short field-charging phase (e.g. about 20 percent of the period or time segment available for each polarity) and a longer diffusion-charging phase. During the latter phase, more ions are present in the aerosol space, but they move only diffusively since no electric field is applied. During the field-free phase no new ions are produced, which results in a gradual decrease of the ion concentration.

Under certain circumstances a charging to the defined charge state of the bipolar diffusion charge is not necessary, but rather a bipolar charging suffices. In this case, simpler voltage forms (e.g. sinusoidal voltage as in FIG. 2*a*) can be used.

Increasing of the maximum voltage has the consequence of immediately increasing the ion concentrations. The flexible control of the charge yield thus allows an adaptation to the aerosol characteristics, such as initial charge state or particle concentration.

The ions can be readily produced in significantly higher concentrations than are possible with radioactive sources. In this connection, the recombination is of greatest importance. Radioactive sources form ions of both polarities at the same time, while in the electrical neutralizer only one polarity is produced by a given active electrode at any given point in time. Thus, in the case of the electrical neutralizer, the recombination is at a far lower level.

Due to the fact that the particle charging is quite slow in comparison to the frequency of the ion sign alternation, a bipolar ion atmosphere is nevertheless simulated for the particles.

Tests show that the present apparatus with an electrode arrangement according to FIG. 1 is capable of reproducing the diffusion-based equilibrium state for particles between 50 and 500 nm.

FIG. 12 shows two particle-size distributions, measured with a scanning mobility particle sizer (SMPS), of a pentaerythritol aerosol. The particle concentration is plotted against the particle diameter in nm. The measurement principle of SMPS is based on diffusion-based bipolar charging. In the first case, the charging is brought about with the electrical neutralizer, and the second curve reproduces the measured particle-size distribution using the conventional krypton source (Model 3077 available from TSI Incorporated).

The resulting particle-size distributions are nearly identical, and small deviations are explained by fluctuations of the aerosol concentration and aerosol particle-size distribution.

Further investigations of, among other things, the ratio of singly negatively- to singly positively-charged particles and of the uncharged share of the neutralized aerosol showed in each case a very good correspondence between the results of the radioactive source and those of the new neutralizer.

According to the invention, the mentioned results are effectively achieved through the combination of the following steps:

1. The alternating voltage used possesses a waveform selected to minimize the time periods during which an appreciable voltage is applied (e.g. according to FIG. 2*b*).

2. The electrodes are arranged such that the region of a strong electric field is as small as possible. Only a very small surface of the emission electrode produces ions. Both the active and the passive electrodes have a small dimension in the flow direction.

3. When flowing through the neutralizer, the aerosol runs through several cycles of the field alternation with diminishing field strength and ion concentration. The particles are still reversed in charge several times, but due to the decreasing impetus the rate of charge reversal diminishes.

4. The generation of the positive and negative ions is equalized by a capacitor coupled to the active electrode. The capacitor thus acts in a controlled manner, and interference from the outside to ensure equal ion concentrations is unnecessary. The capacitor can be an additional component, can consist of a shielded cable, or can be a part of the active electrode.

5. Upon the entrance of the aerosol into the electrical neutralizer, it is situated near the location at which ions for the charging or charge reversing are present in a nearly field-free space. This is most simply realized in that the aerosol, immediately after entrance into the neutralizer, passes through the location of highest ion density (e.g. according to FIG. 4 or 11).

6. The neutralized particles leave the neutralizer after a very short total dwell time, so that diffusion separation and agglomeration effects are excluded to the greatest possible extent.

Another aspect of the present invention is a device for adjusting the electrical charge distribution of an aerosol. The device includes a body defining a flow path to guide passage of an aerosol through the body. A corona discharge component is mounted with respect to the body and has a corona discharge region disposed along the flow path. An electrically conductive structure is mounted with respect to the body, electrically isolated from the corona discharge component, and selectively disposed in spaced apart relation to the corona discharge component. Electrical fields produced by voltages between the conductive structure and the corona discharge region extend into the flow path to define an aerosol space. Circuitry is provided for producing, between the conductive structure and the corona discharge region, a first voltage during first periods and a second voltage of opposite polarity to the first voltage during second periods, in an alternating sequence of the first and second periods. At least the first voltage exceeds a corona discharge threshold voltage, thereby causing ions of a first polarity to enter the aerosol space for a merger with the aerosol, to change an electrical charge distribution of the aerosol. Each of the first periods is shorter than a predetermined first time, and each of the second periods is shorter than a predetermined second time. The first and second times are selected with respect to the associated first and second voltages, respectively, and with respect to the distance between the corona discharge region and the conductive structure, to prevent any substantial loss of the ions or charged particles to the conductive structure.

Preferably the device is operable either in a unipolar charging mode in which only the first voltage exceeds a corona discharge threshold, or a bipolar charging mode in which both the first and second voltages exceed corona discharge thresholds. In the latter case, ions of a second polarity opposite the first are caused to enter the aerosol space during the second periods, for merger with the aerosol.

A preferred corona discharge component is an elongate needle formed of stainless steel or another electrically conductive material. The needle functions as an active electrode, with the corona discharge region provided by the needle tip. The preferred electrically conductive structure is a passive electrode, typically in the form of a ring surrounding and coaxial with the active electrode. Alternatively, the passive electrode can be a plate.

Preferably, the first and second voltages are produced by an AC voltage source coupled to the conductive structure, i.e. the passive electrode. Generating the AC voltage at a frequency of at least 100 Hz determines a cycle time at most 0.01 seconds. Thus, every second includes one hundred cycles, each including one period or time segment for each polarity and two reversals in the polarity of the electrical field between the active and passive electrodes. The rapid reversals in field polarity substantially eliminate the loss of ions or charged particles through deposition onto the passive electrode. In the context of bipolar charging, the rapid reversals produce a closer approximation to charging with a radioactive source.

In the Drawings

Further details and advantages are understood from the structural examples represented in the following detailed description and in the drawings, in which:

FIG. 1 schematically illustrates an aerosol neutralizer constructed in accordance with the present invention;

FIGS. 2*a*–2*c* illustrate alternative waveforms for an AC voltage applied between active and passive electrodes of the device;

FIG. 3 schematically illustrates a particle characterizing system employing the device;

DETAILED DESCRIPTION OF THE PREFERRED EMBODIMENTS

Figure 1:
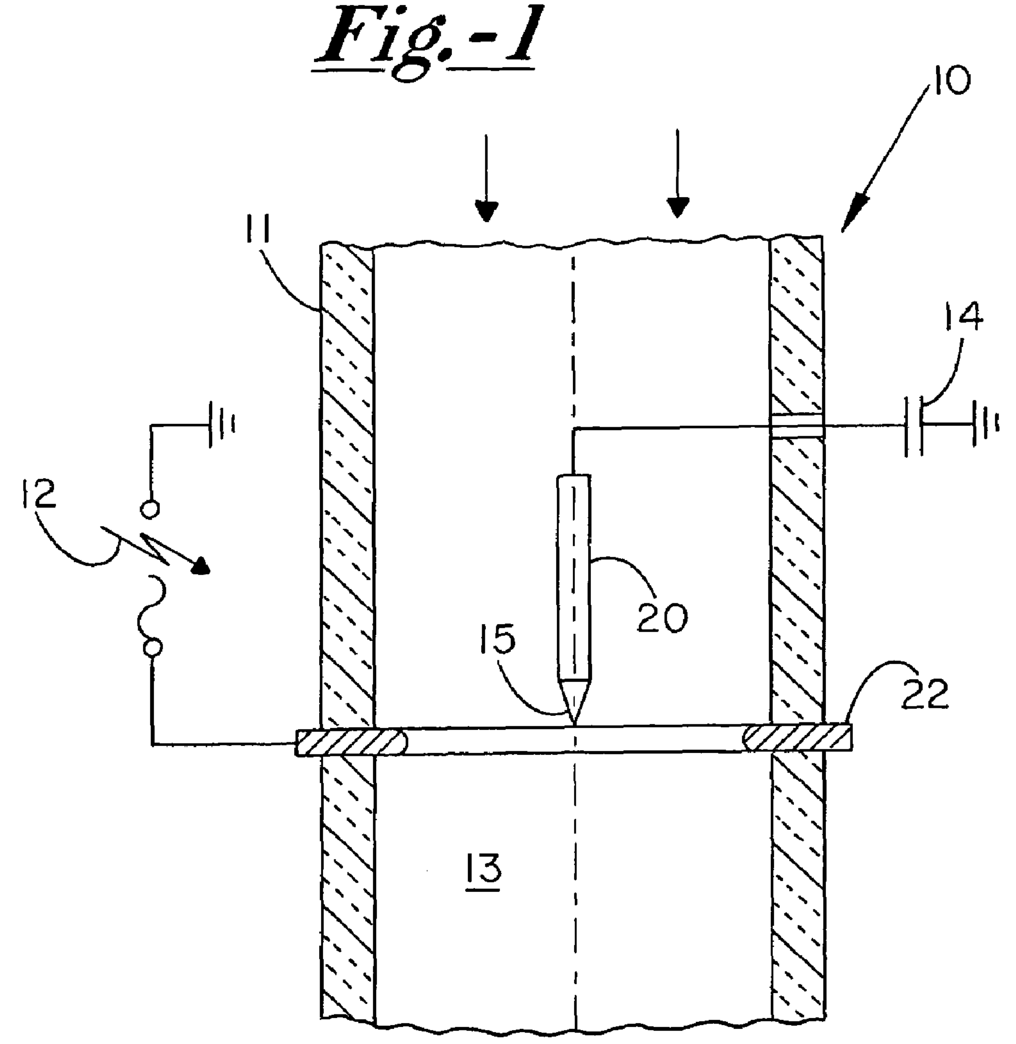

FIG. 1 shows a typical layout of an aerosol charge altering apparatus 10. The apparatus includes a tubular body or casing 11 forming a channel 13 to provide a flow path to guide an aerosol through the apparatus in the direction indicated by the arrows. An active electrode 20, preferably a needle formed of stainless steel or other metal, is supported relative to the casing at the center of channel 13. Electrode 20 is elongate in the direction of aerosol flow. A sharp tip 15 is formed at the downstream end of electrode 20. An annular passive electrode 22, preferably formed of brass and having a thickness of about 0.2 mm in the aerosol flow direction, is fixed to casing 11 in concentric surrounding relation to active electrode 20.

Electrodes 20 and 22 are electrically isolated from one another. Circuitry associated with the electrodes includes an alternating voltage supply 12 coupled to passive electrode 22, and a grounded capacitor 14 coupled to active electrode 20.

When providing the AC voltage to electrode 22, supply 12 creates a voltage differential between electrodes 20 and 22. The voltage differential, and the resulting electrical field between the electrodes, oscillate with the voltage level at the passive electrode. The frequency of AC voltage oscillation preferably is above 100 cycles per second, and more preferably is in the range of 1 kHz to 6 kHz. Increasing the frequency reduces the length of each period of the cycle in which ions of a given polarity are generated. As a result, apparatus 10 more closely emulates charging devices that use radioactive sources. The upper limit to the AC voltage frequency is limited by the time required to develop a corona discharge, which is in the range of nanoseconds. Accordingly, the AC voltage frequency could be several MHz if desired.

In the bipolar charging mode capacitor 14 tends to equalize the current in both directions (i.e. tends to zero the mean current $\bar{I}$). This ensures that positive and negative ions are generated at equal concentrations. In lieu of capacitor 14, an additional voltage or current source can be coupled to electrode 20 to adjust the negative and positive charge concentrations relative to each other.

Figure 2A:
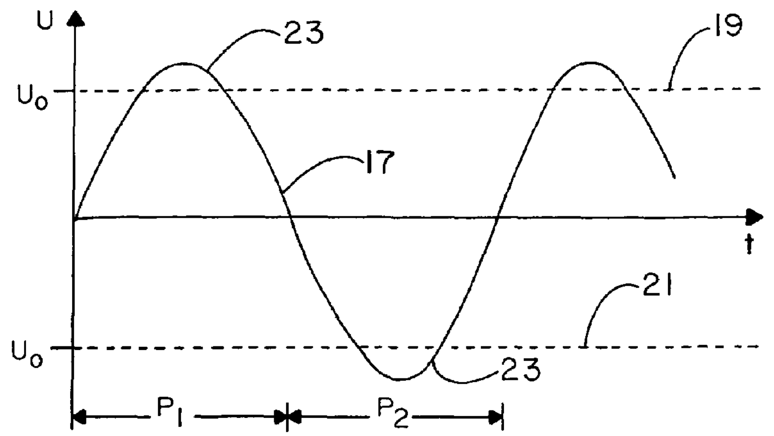
Figure 2B:
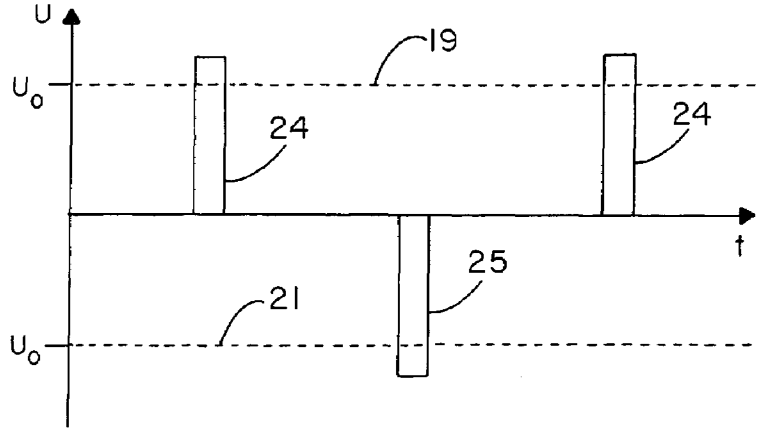
Figure 2C:
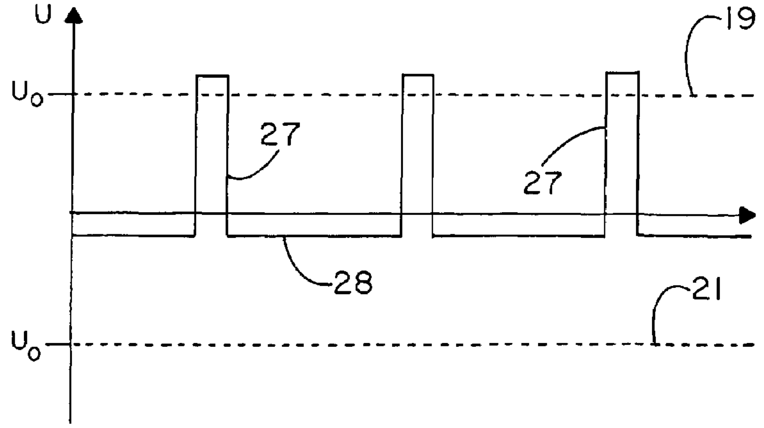

FIGS. 2*a*–2*c* are plots illustrating different waveforms for generating the alternating voltage. In FIG. 2*a*, the voltage waveform is a sine wave 17. Broken lines 19 and 21 respectively represent positive and negative threshold voltages $U_0$ for creating a corona discharge at the corona discharge region, i.e. tip 15. Along peak regions 23, the AC voltage has a magnitude sufficient to create a corona discharge, either by virtue of a positive voltage above the upper threshold or a negative voltage below the lower threshold. As indicated in the figure, each cycle of the AC voltage includes a first period $P_1$ during which a positive voltage (electrode 22 relative to electrode 20) produces a corona discharge of negative ions leaving the discharge region, and a second period $P_2$ in which a negative voltage results in positive ions leaving the corona discharge region.

FIG. 2*b* shows the AC voltage generated as a series of alternating positive and negative pulses 24 and 25. While each cycle again consists of a first period and a second period for a positive and negative pulse, respectively, each pulse occupies only a fraction (e.g. one-fifth) of its associated period. Pulses 24 and 25 are shortened in this manner to reduce the field charging effect relative to the diffusion charging effect.

FIG. 2*c* illustrates a pulsed voltage for charging in the unipolar mode. Each cycle includes a narrow positive pulse 27 that exceeds the positive corona discharge threshold, and a wider portion 28 with an amplitude less than the corona discharge threshold. The electrical field generated during portions 28 is weaker than the fields that cause ion discharge during pulses 27. However, the reversals in the voltage differential and electrical field between electrodes 20 and 22, as in bipolar charging arrangements, tend to prevent loss of ions or charged particles to the passive electrode.

Figure 3:
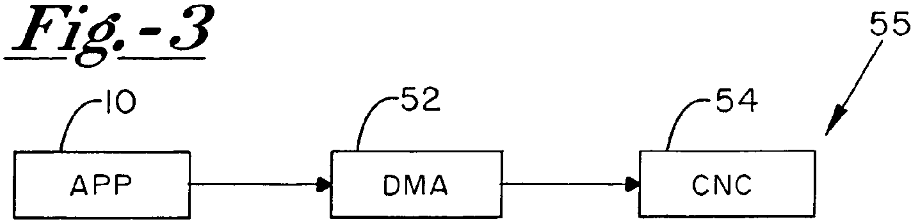

FIG. 3 illustrates a particle characterizing system 55 including apparatus 10, a differential mobility analyzer (DMA) 52 coupled to receive the output of apparatus 10, and a condensation particle counter (CNC) 54. Apparatus 10 in this system is configured for bipolar charging, and functions as a neutralizer to charge (and reverse charge) an incoming aerosol to the diffusion based bipolar charge distribution. In DMA 52, a predetermined electrical field is used to separate the aerosol particles according to size, based on their differing electrical mobilities. In CNC 54, separated particles travel through a saturator and are cooled to cause vapor condensation to "grow" each particle. The particles then are passed through a focused laser light source to generate a particle count indicative of particle concentration.

Figure 4:
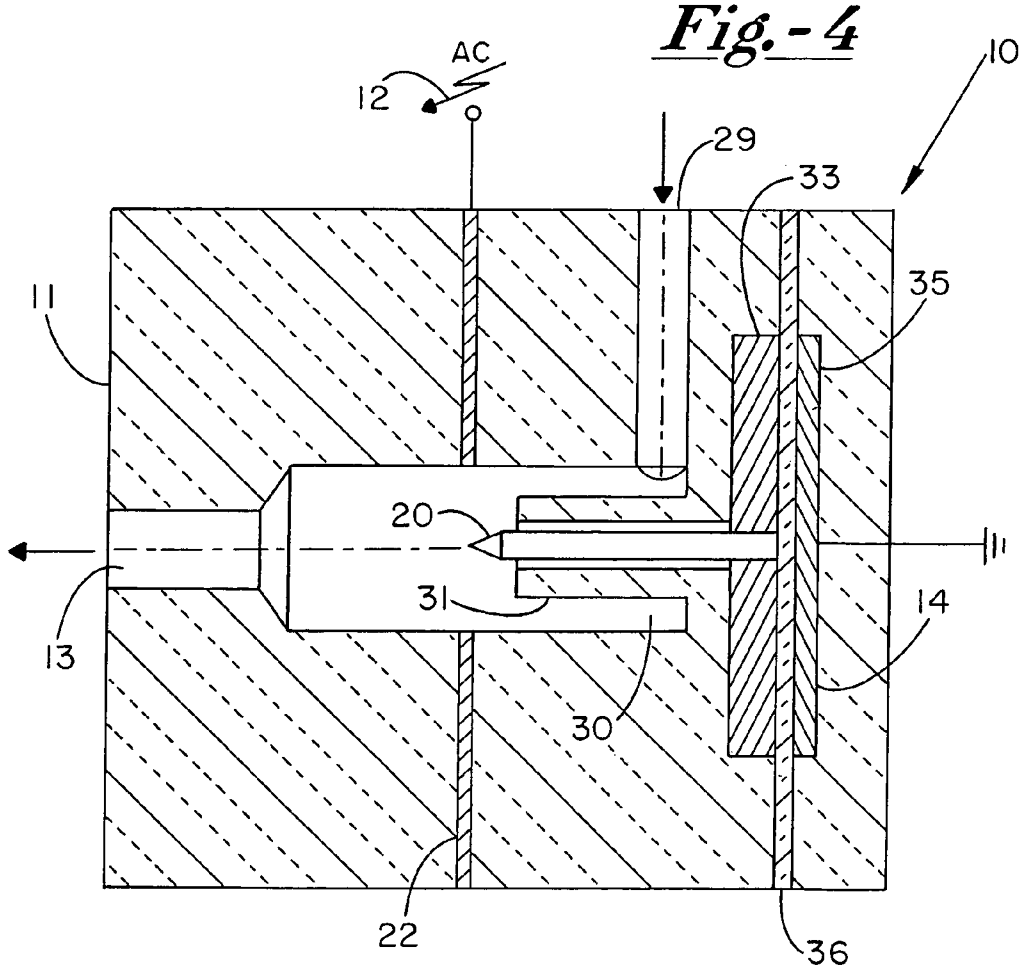
FIG. 4 illustrates the device in greater detail.

FIG. 4 shows charge altering apparatus 10 in greater detail. Casing 11 is insulative, preferably formed of a plastic such as polyvinyl chloride (PVC). The aerosol enters the apparatus through an inlet 29 and proceeds to an annular gap 30. A sleeve 31 surrounds active electrode 20 to prevent the aerosol from precipitating on the electrode. The electrode is a needle formed of stainless steel or other metal and has a diameter in the range of 1–3 mm. Passive electrode 22, preferably formed of brass, is embedded into the plastic casing. Capacitor 14 includes an element 33 coupled to electrode 20, and an element 35 coupled to ground and spaced apart from element 33. A polytetrafluoroethylene (Teflon), disk 36 occupies the space between the two elements. The capacitance of the capacitor preferably is about 50 pF. If desired, plates 33 and 35 are simply spaced apart from one another without the Teflon disk, to facilitate control of the active electrode voltage through an external source.

When the magnitude of the alternating voltage exceeds the corona discharge threshold, a corona discharge is created, and an ion current (of a polarity corresponding to the voltage) flows into the gap between electrodes 20 and 22. Initially, a voltage other than zero but below the corona discharge threshold generates an electrical field between electrodes 20 and 22. Due to the electrode geometry, specifically the sharp point of electrode 20 and the thin (0.2 mm) dimension of electrode 22 in the aerosol flow direction, the electrical field is strong in the region directly between tip 15 and electrode 22, then diminishes in strength rapidly in the direction of the flow away from the electrodes. The region of maximum field strength is conveniently thought of as an aerosol space, which is crossed by the aerosol as it flows along channel 13. When the voltage exceeds the corona discharge threshold, a corona discharge is initiated and ions of the corresponding polarity flow away from the tip into the aerosol space, to merge with and alter the charge distribution of the aerosol as it flows through and beyond the aerosol space.

The corona discharge charges capacitor 14. Thus, the potential of the capacitor changes over time with the AC voltage. The capacitor adjusts the active electrode voltage in the direction toward a net zero current, i.e. toward equality in the concentrations of positive and negative ions generated by the corona discharge.

Increasing the AC voltage amplitude causes the ions of the corresponding polarity to travel further into the inter-electrode gap. Sufficiently strong electrical fields can cause some of the ions to cross the gap completely and become lost by deposition onto the passive electrode. Due to the higher electrical mobility of negative ions compared to positive ions, more negative ions are lost to the passive electrode, creating an imbalance that is not compensated by the capacitor. Thus, the parameters that determine ion travel and location are selected with care to insure that no significant portion of the ions is likely to reach the passive electrode. These parameters include, primarily, the distance between electrodes 20 and 22, the strength of the electrical field between the electrodes which is a function of the voltage, and the duration or time of each period over which either a positive or a negative interelectrode voltage is maintained.

Reducing the AC voltage amplitude is one approach to reducing the precipitation loss of ions to the passive electrode. However, increasing the frequency to shorten the respective periods of positive and negative ion generation is particularly effective in minimizing ion deposition. Shortening the period during which ions of a given polarity are generated effects an earlier termination of the electrical field accelerating those ions toward the passive electrode. Also, an earlier reversal of the electrical field effects an earlier deceleration of those ions.

Figure 5:
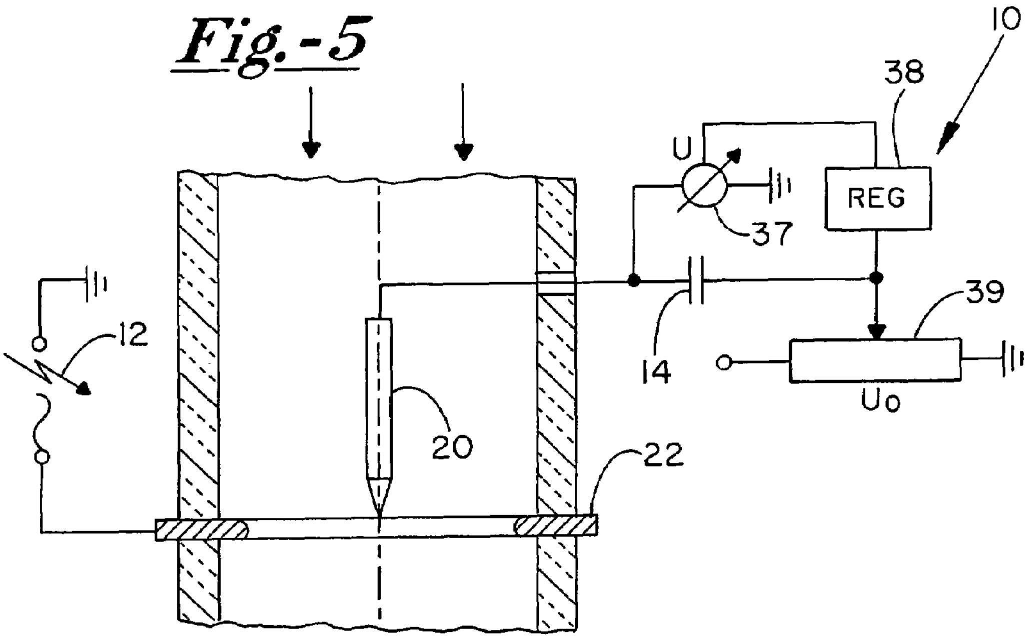
FIG. 5 illustrates an alternative device incorporating a controlled voltage applied to the active electrode.

A further possibility for regulating the charge yield is represented in FIG. 5. In order to minimize the loss current via capacitor 14, the capacitor is acted upon by a bias voltage. The level of the bias voltage is controlled with the aid of the potential of the active electrode 20. More particularly, a separate voltage source 37 and a regulator 38 coupled to a variable resistor 39 are used to adjust a biasing voltage to capacitor 14, based on the mean voltage at electrode 20.

Alternatively, the charge of the neutralized aerosol can be measured, and the value can be used as a further control voltage biasing the capacitor.

Figure 6:
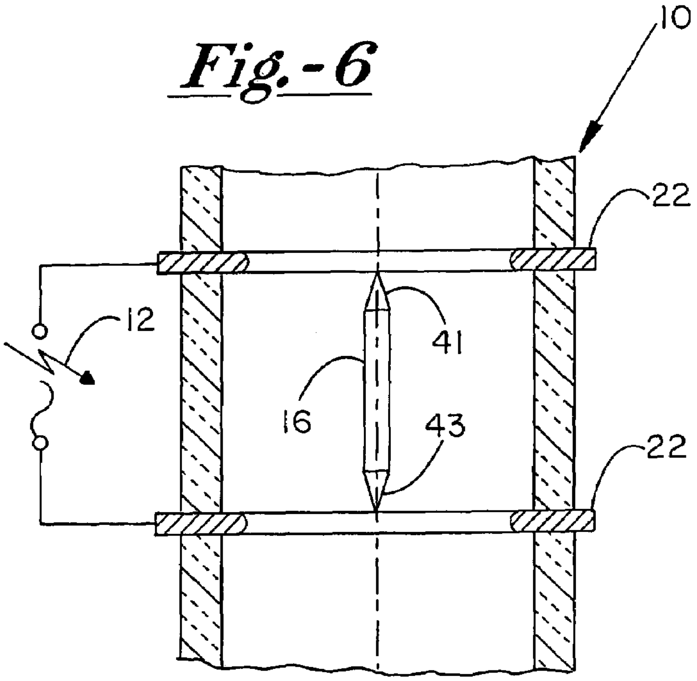
FIGS. 6–9 illustrate alternative embodiments incorporating several active electrodes.
Figure 7:
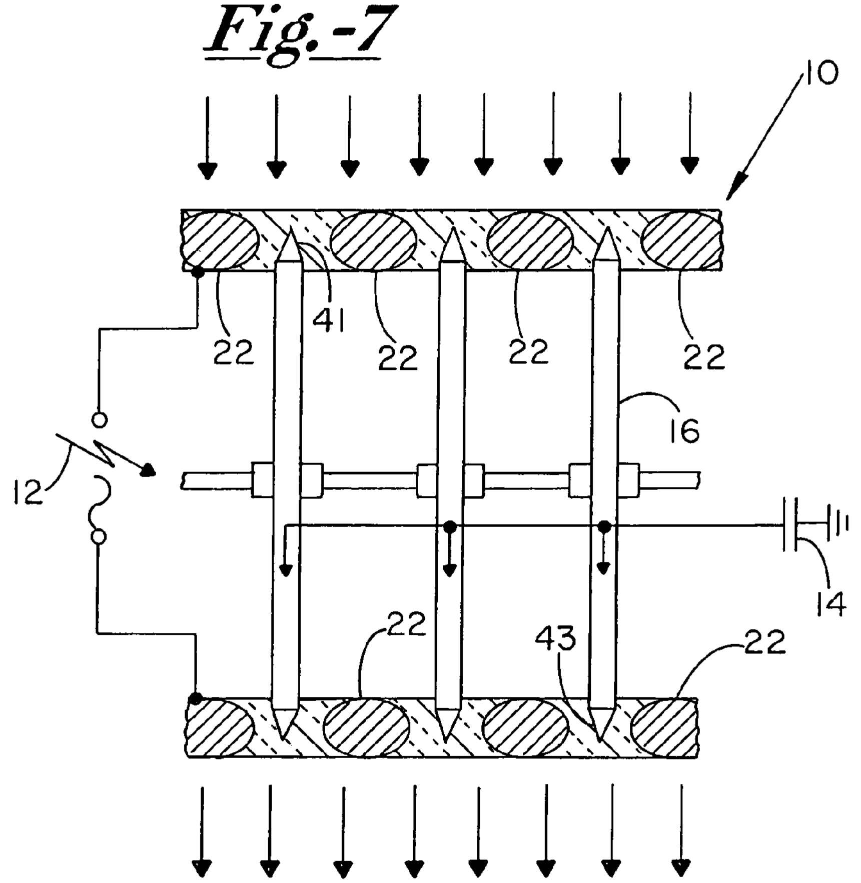
Figure 8:
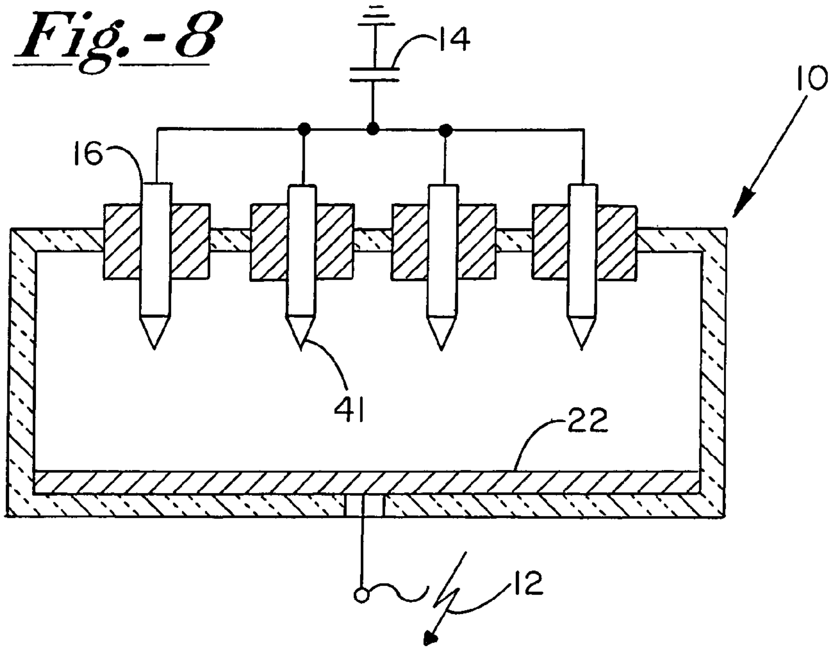

FIGS. 6, 7, and 8 show alternative embodiments of charge adjusting devices having several active electrodes. FIG. 6 shows an active electrode 16 with tips 41 and 43 at its opposite ends to provide upstream and downstream corona discharge regions. The tips are axially aligned with respective annular passive electrodes 22, both of which are coupled to the same alternating voltage source 12.

In FIG. 7, three electrodes 16, each with upstream and downstream corona discharge tips 41/43, are disposed between adjacent pairs of passive electrodes 22.

The designs in FIGS. 6 and 7 are only slight modifications of the design in FIG. 1.

The design in FIG. 8 has several active electrodes 16 with single corona discharge tips 41 positioned in a row. Electrodes 16 are arranged at a 90° angle with respect to the direction of flow. The electrical field across the gap between electrodes 16 and a passive electrode 22 is more uniform than that of the design according to FIG. 1. The ion field produced by the individual discharge points undergoes as a whole only a small radial expansion in the flow stream plane.

The discharging of the respective active electrodes in FIGS. 7 and 8 can occur with a single control circuit with a single capacitor 14 as shown, or with separate control elements for each active electrode.

With respect to the particle deposition, it is advantageous to feed the aerosol to minimize the dwell time in the vicinity of the electrodes. This is possible, for example, according to the designs represented in FIGS. 4 and 11.

Figure 11:
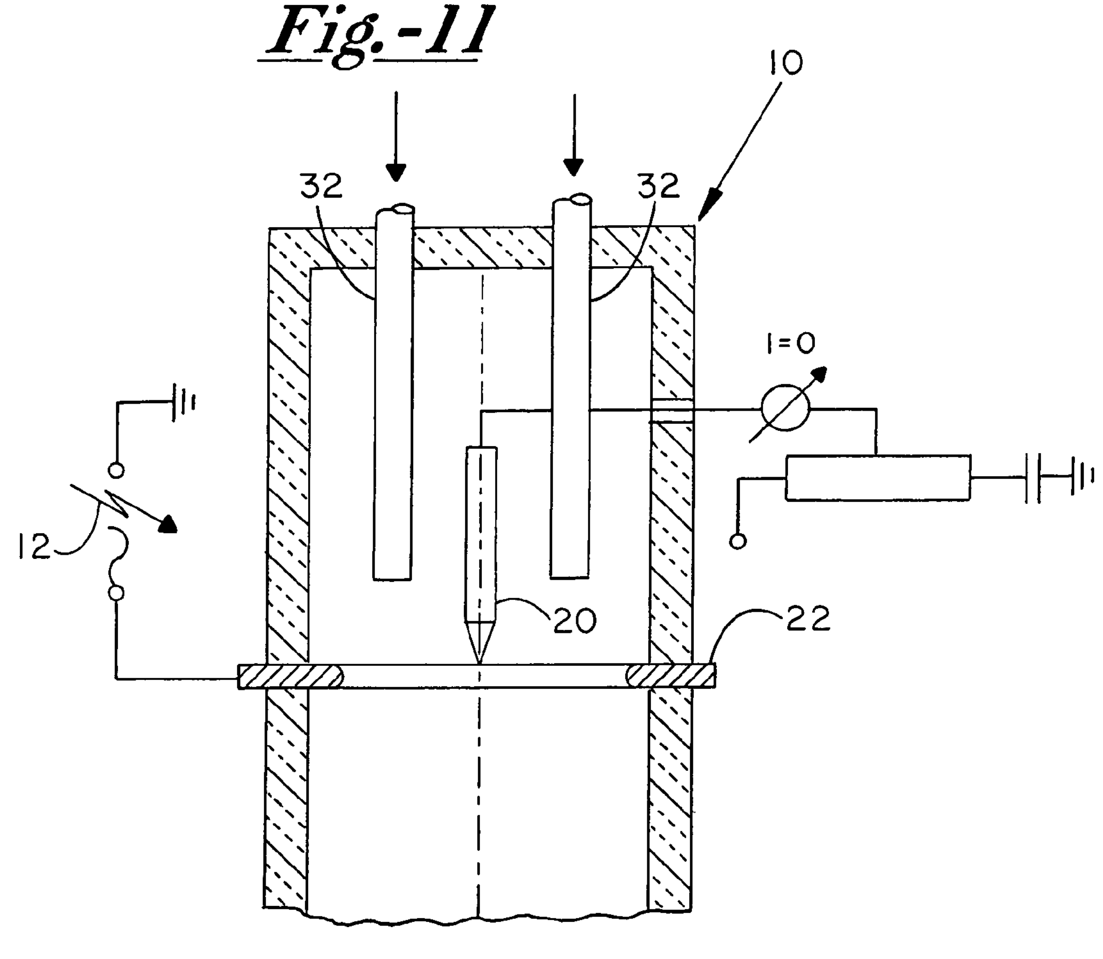
FIG. 11 illustrates an alternative embodiment with tubes for introducing the aerosol proximate the active electrode.
Figure 12:
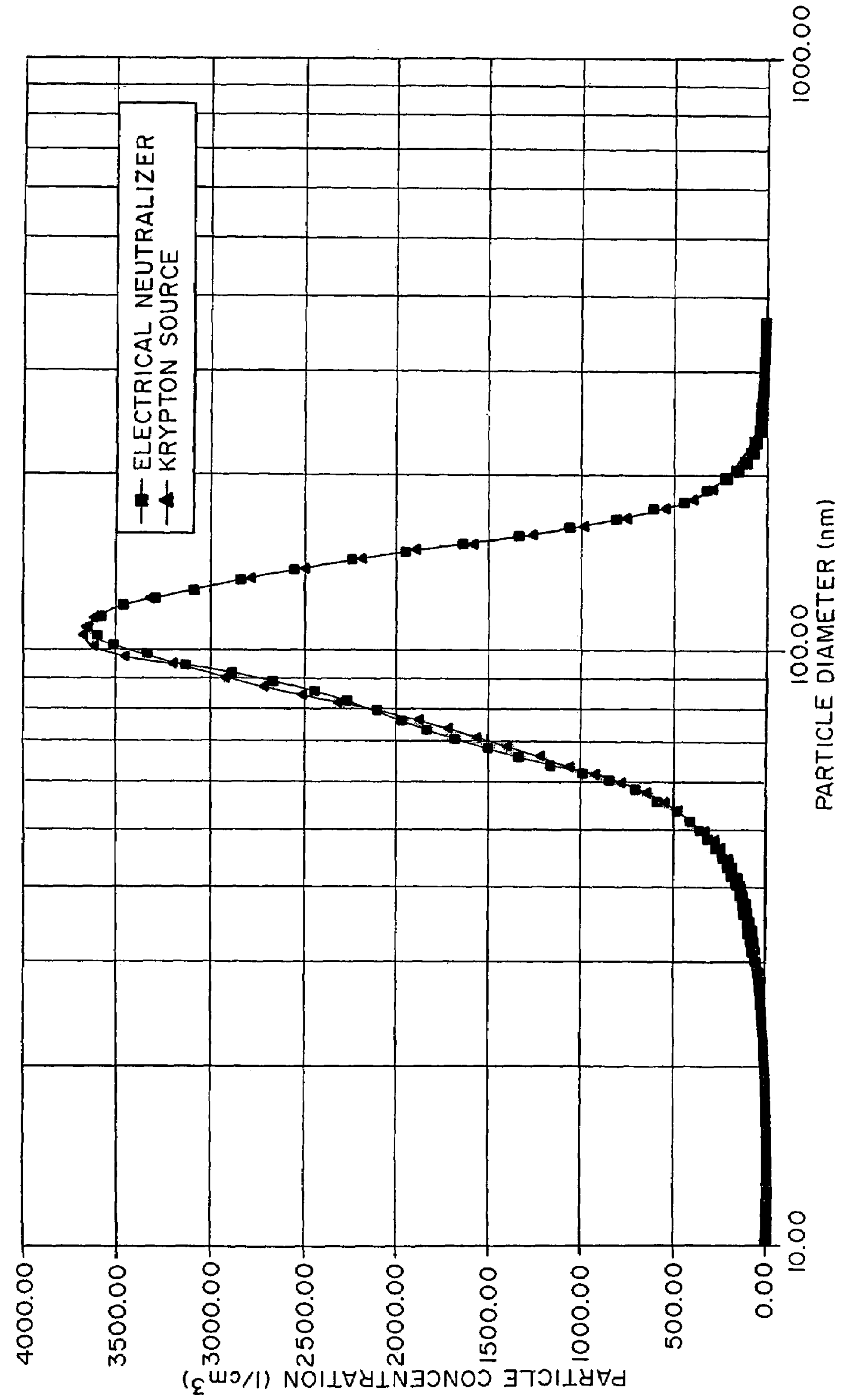
FIG. 12 is a plot of comparative particle-size distributions based on a corona-discharge source and a radioactive ion source.

In FIG. 4, the aerosol is provided via an annular gap 30. In FIG. 11 the aerosol is provided via tubes 32.

Figure 9:
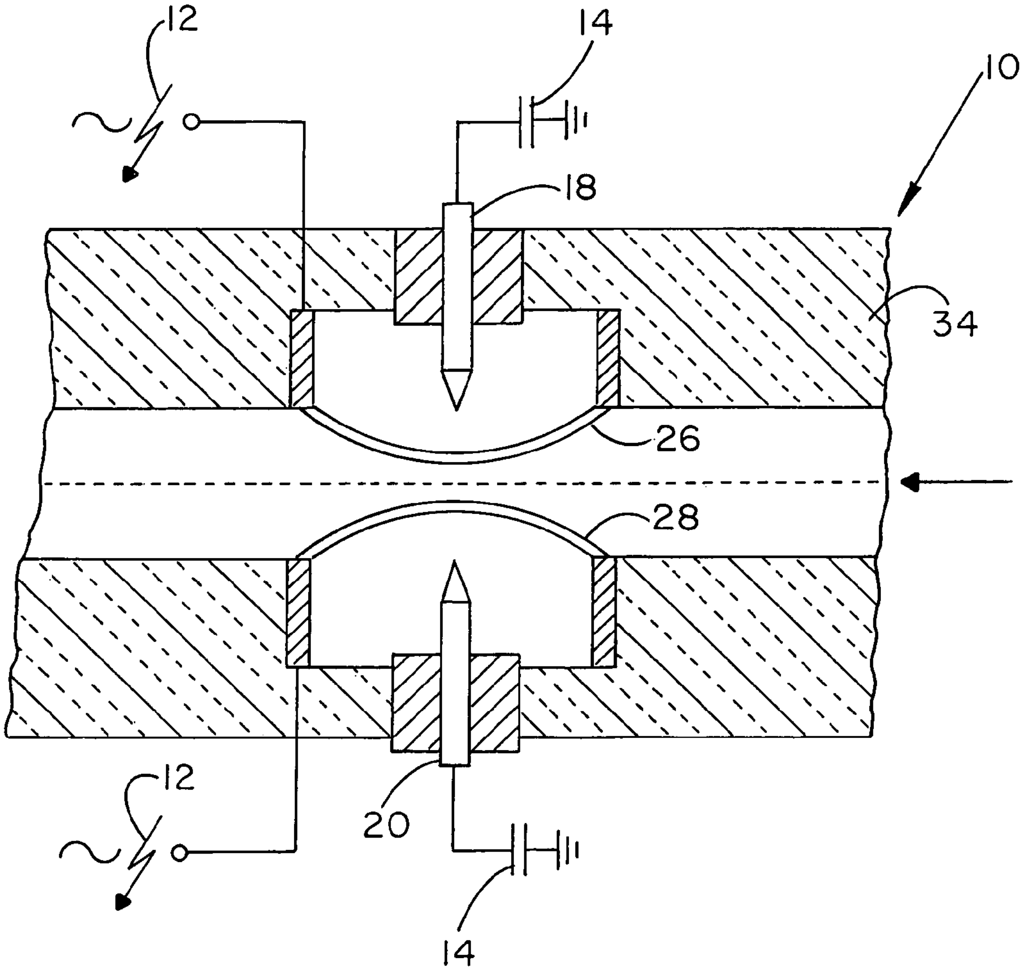

A further structural variant is represented in FIG. 9. One or several active electrodes 18, 20 are embedded into a wall 34 of neutralizer 10 and are surrounded by annular passive electrodes 26, 28. A portion of the ions follows into an aerosol space between electrodes 18 and 20, where the ions are available for the particle charging. Electrodes 18 and 20 are disposed along the flow path, but do not project into the path.

The advantage of this layout is that the aerosol need not flow directly past the active electrodes. Moreover, the electric field prevailing in the aerosol space is significantly smaller than the field in the structures according to FIG. 1, since the highest field strength is in the immediate vicinity of active electrodes 18 and 20. The current utilization is lower than in the structures according to FIG. 1.

Figure 10:
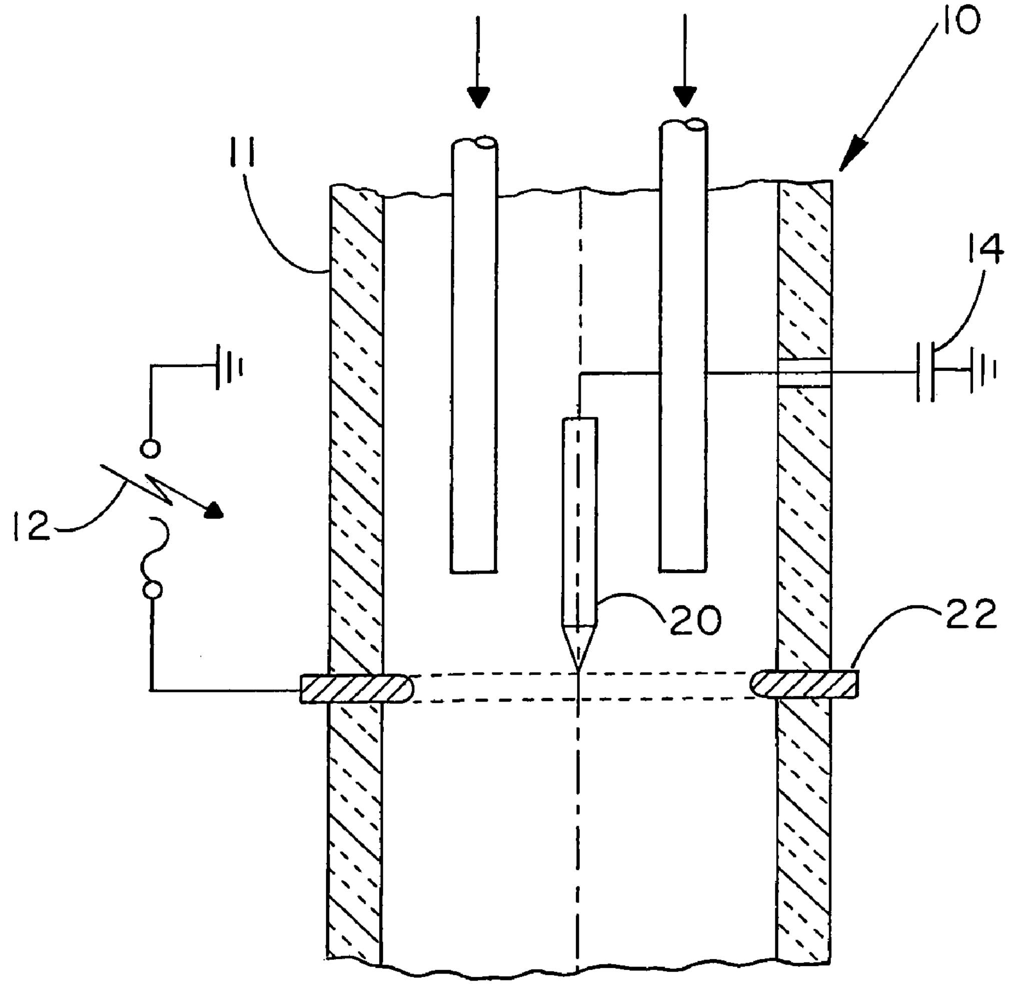
FIG. 10 illustrates an alternative embodiment device with a passive electrode located outside an aerosol conduit.

In certain circumstances it can be advantageous to mount the passive electrode 22 outside the aerosol space. This is seen in FIG. 10 showing an example similar to the structure according to FIG. 1. In the FIG. 10 embodiment, wall 11 if made from an electrically insulating material can prevent ions from crossing the aerosol channel to reach the passive electrode 22, and more ions leave the neutralizing device. The same effect is achieved in FIG. 1 by inserting a capacitor between passive electrode 22 and alternating voltage supply 12. Charges reaching the passive electrode would be barred from leaving the set-up. This can further enhance the balancing of positive and negative ion generation.

The waveform of the alternating voltage can consist of a simple sine wave (FIG. 2*a*), but the use of an alternating voltage form according to FIG. 2*b* is better adapted to lower the influence of the field charging relative to diffusion charging.

If the voltage waveform according to FIG. 2*c* is used, the particles are charged in a unipolar manner. For the case represented, the onset voltage for corona discharge is attained only for the negative corona discharge. Usually the alternating voltage is not necessarily applied to the passive electrode.

The integral of the voltage over the time for unipolar charging should be zero, to minimize the net movement of the particles in planes transverse with respect to the direction of flow.

Figure 13:
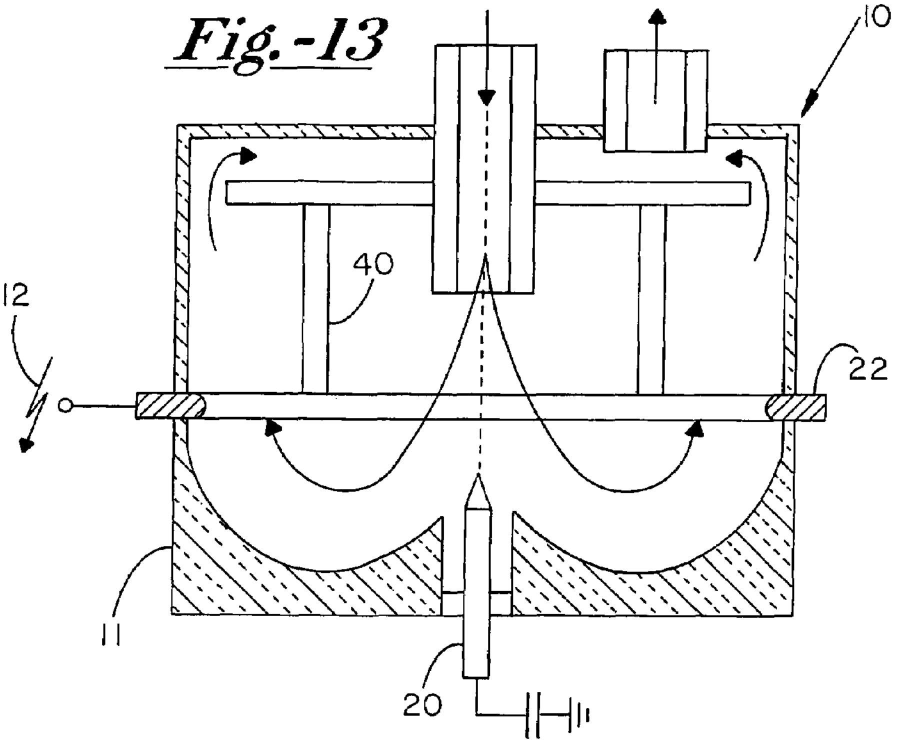
FIG. 13 illustrates an alternative embodiment with a casing shaped to channel the aerosol past a guide plate.

An alternative charge adjusting configuration advantageous with respect to aerosol charging is shown in FIG. 13. In comparison to the configurations represented in FIGS. 1 and 4 through 11, a casing 11 is shaped to conduct all of the aerosol past a guide 40, to ensure that the aerosol flows through the region of higher ion concentrations. Along this region the flow includes a radially outward curvature, eventually to a reversal in direction.

Figure 14:
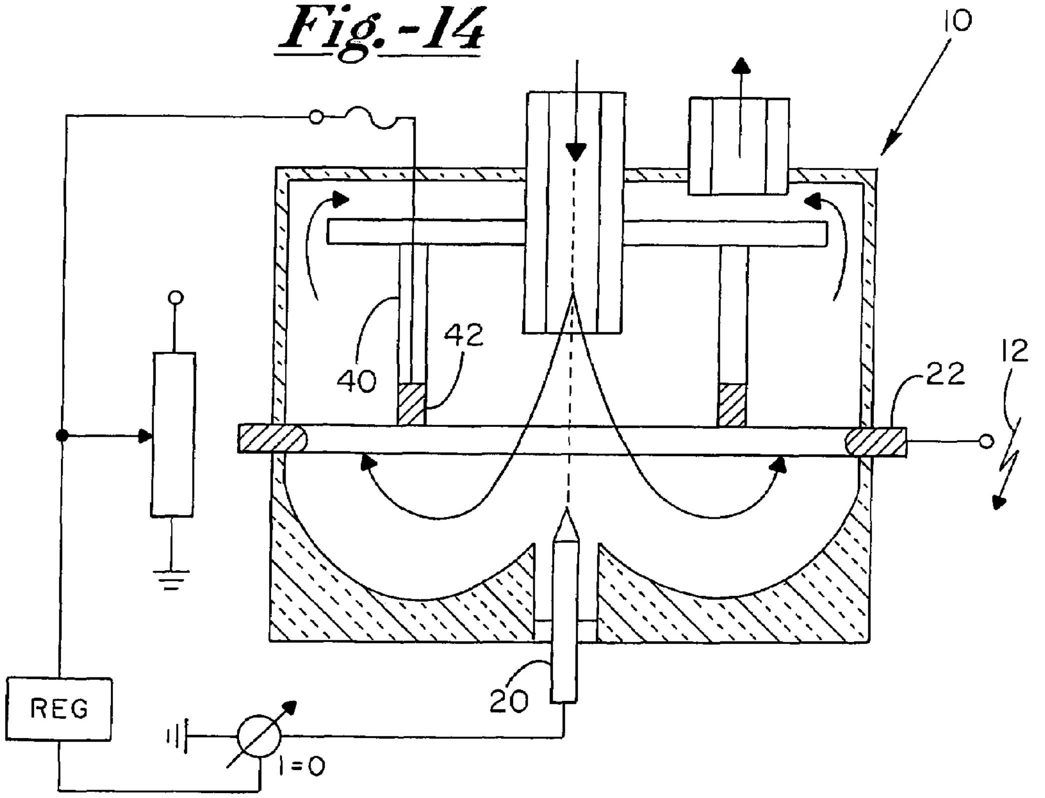
FIG. 14 illustrates an alternative embodiment incorporating an additional electrode.

In several variants mentioned above, regulation of the positive and negative charge yields is realized through the superimposition of a displacement voltage on active electrode 20 or passive electrode 22. A further possibility is represented in FIG. 14, where a third electrode 42 is placed into the aerosol space. The electric field can be controlled through the application of a DC voltage to electrode 42 and an adjustment of active electrode 20 to the temporally-averaged zero current value.

Figure 15:
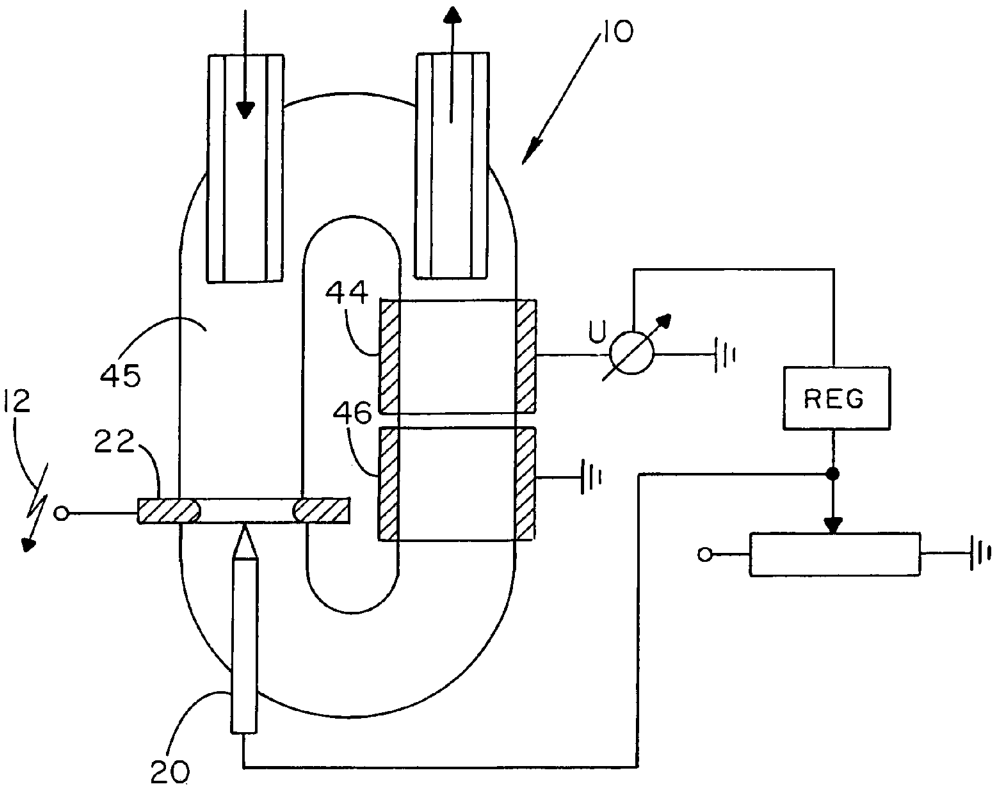
FIG. 15 illustrates an alternative embodiment with an annular flow path for recirculating an aerosol.

A further structural variant is represented in FIG. 15. The aerosol is provided to an annular channel 45, in which it can be circulated multiple times and, in the process, successively charge-reversed into the neutral state. A metallic ring electrode 44 is used to measure the aerosol charge state. The potential of ring electrode 44 is used to regulate active electrode 20. In addition, an electrode 46 coupled to ground is used to remove the excessive charge through precipitation of ions. This variant is advantageous above all when aerosols with high excess charging of one polarity are to be neutralized.

Figure 16:
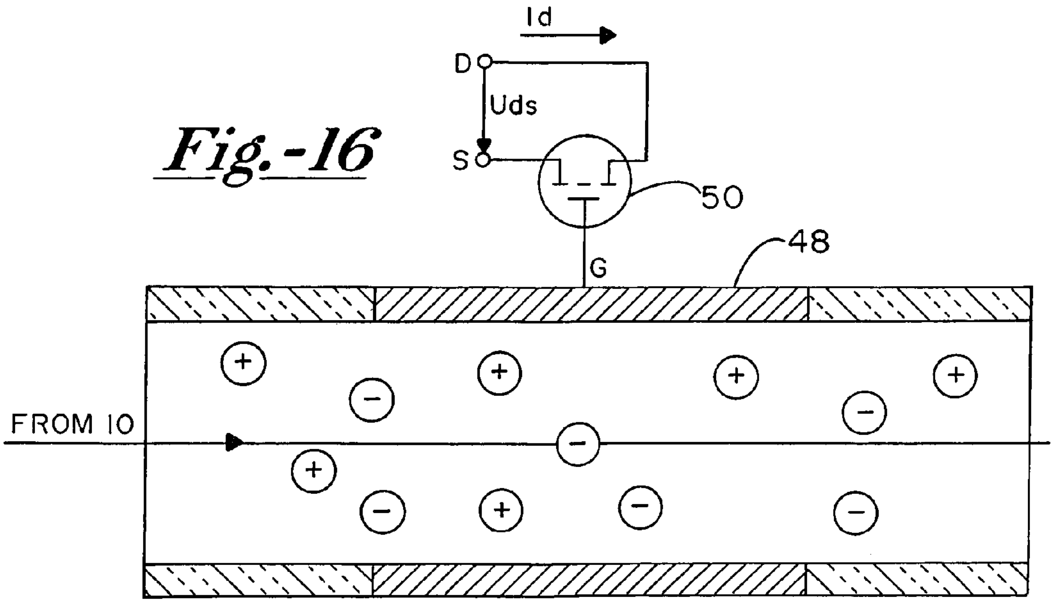
FIG. 16 schematically illustrates an alternative arrangement for using particle charge to control the voltage to the active electrode.

A regulation of the charge yield can also be brought about through an arrangement according to FIG. 16. A metallic tube 48, insulated from the environment, is positioned to receive the neutralized aerosol downstream of neutralizer 10. A field-effect transistor (FET) 50 is coupled to the tube. The net charge of the aerosol particles in tube 48 creates an image charge in the metallic tube, which changes the gate voltage G of the FET. The gate voltage G is characterized through the drain current Id flowing from the drain D to the source S and can be used to control the displacement voltage on active electrode 20. The advantage of this method is that the induced charges on the metallic tube are not dissipated. Charge measurement does not require deposition of the particles or their extraction from the flow.

In an alternative to the embodiments disclosed above, the electrical discharge can be produced with the aid of high-frequency electromagnetic radiation. At least one elongated metallic body, e.g. a wire, is suspended in the channel 13 and irradiated with electromagnetic waves in such a way that the induced fields lead to the formation of high-frequency corona discharges of opposing polarity at the ends of the metallic body. In another approach, one or more active electrodes 20 can be irradiated with shortwave light for a more reliable initiation of corona discharge.

The separation in the neutralizer is very low and does not prevent correct functioning even when particles separate onto the active electrode and thus change the discharging characteristics. Likewise space-charging effects, which at high particle concentrations influence the discharging, can be compensated. The capacitor rapidly readjusts the base voltage to compensate for these effects.

Should a cleaning of the electrodes or of the entire electrical neutralizer nevertheless become necessary, this can take place safely after the disconnection of the high voltage.

In addition, a continuous cleaning or optional placement of the electrodes can be implemented. Thus, for the design according to FIG. 1, instead of the ring electrode 22 a movable wire can be used as the passive electrode.

The ozone loading of the exiting aerosol can be checked through an ozone sensor.

What is claimed is:

1. A device for adjusting the electrical charge distribution of an aerosol, including:

a body defining a flow path to guide passage of an aerosol in a flow direction through the body;

a corona discharge component mounted with respect to the body and having a corona discharge region disposed along the flow path;

an electrically conductive structure mounted with respect to the body, electrically isolated from the corona discharge component and disposed in spaced apart relation to the corona discharge component; and circuitry for, generating a voltage between the corona discharge region and the conductive structure, said voltage having opposite polarities during respective first and second periods alternating at a selected frequency to produce an electrical field between the corona discharge component and the conductive structure that alternates between the opposite polarities at the selected frequency;

wherein the voltage, during a predetermined part of each first period, exceeds a corona discharge threshold voltage thereby causing ions of a first polarity to enter an aerosol space along a flow path for a merger with the aerosol to change an electrical charge distribution of the aerosol;

wherein the conductive structure is sized to provide the electrical field with a field strength that diminishes rapidly in the flow direction away from the aerosol space; and wherein the selected frequency and the predetermined part of each first period are selected with respect to the voltage, and with respect to the distance between the corona discharge region and the conductive structure, to reduce a field charging effect of the electrical field relative to a diffusion charging effect and prevent any substantial loss of ions to the conductive structure.

2. The device of claim 1 wherein:

the voltage, during a predetermined part of each second period, exceeds a corona discharge threshold voltage thereby causing ions of a second polarity opposite the first polarity to enter the aerosol space for a merger with the aerosol to change an electrical charge distribution of the aerosol, and the predetermined part of each second period is selected with respect to said voltage and said distance, to reduce the field charging effect relative to the diffusion charging effect and prevent any substantial loss of ions to the conductive structure.

3. The device of claim 2 further including:

a voltage source coupled to the corona discharge component for biasing the corona discharge component toward production of ions of the first and second polarities in equal concentrations.

4. The device of claim 3 wherein:

the source comprises either a constant voltage source or a constant current source.

5. The device of claim 3 wherein:

the source comprises a grounded capacitor.

6. The device of claim 3 wherein:

the source comprises a regulating component for generating a voltage variable in response to either a mean voltage at the corona discharge component or a charge state of the aerosol after said change in the electrical charge distribution.

7. The device of claim 6 wherein:

the regulating component includes a field-effect transistor.

8. The device of claim 2 wherein:

the circuitry is adapted to produce an alternating voltage between the corona discharge region and the conductive structure.

9. The device of claim 8 wherein:

the selected frequency is at least 100 Hz.

10. The device of claim 1 wherein:

the corona discharge component comprises an active electrode, and the conductive structure comprises an annular passive electrode disposed in surrounding concentric relation to the active electrode.

11. The device of claim 10 further including:

a field-controlling electrode mounted with respect to the body and disposed proximate and electrically isolated from the active electrode and the passive electrode, and a voltage source for biasing the field-controlling electrode to influence the electrical field between the active and passive electrodes.

12. The device of claim 1 wherein:

the circuitry includes an alternating voltage source coupled to the conductive structure.

13. The device of claim 1 further including:

a grounded electrode mounted with respect to the body and disposed downstream of the corona discharge component and the conductive structure, for removing excessive charges from the aerosol.

14. The device of claim 1 wherein:

the voltage during each second period is less than a corona discharge voltage threshold, whereby substantially only ions of the first polarity enter the aerosol space.

15. The device of claim 1 further including:

a particle characterizing system disposed to receive the aerosol downstream of the aerosol space.

16. The device of claim 15 wherein:

the particle characterizing system is adapted to separate the aerosol particles according to size, based on electrical mobility.

17. The device of claim 1 wherein:

the aerosol upstream of the aerosol space includes suspended particles, and the circuitry is adapted to maintain a substantially constant particle concentration of the aerosol while changing the electrical charge distribution, whereby a particle concentration level of a given portion of the aerosol downstream of the aerosol space is substantially equal to an initial particle concentration of that portion upstream of the aerosol space.

18. A process for altering an electrical charge distribution of an aerosol, including:

causing an aerosol to move in a flow direction along a flow path;

disposing a corona discharge component along the flow path;

disposing an electrically conductive structure in proximate spaced apart relation to the corona discharge component and electrically isolated from said component;

generating a voltage between the corona discharge component and the conductive structure, at opposite polarities during respective first and second time segments alternating at a selected frequency to produce an electrical field between the corona discharge component and the conductive structure that alternates between the opposite polarities at the selected frequency;

during a predetermined part of each first time segment, generating the voltage at an amplitude exceeding a corona discharge threshold, thus to cause ions of a first polarity to enter an aerosol space along the flow path for a merger with the aerosol to change an electrical charge distribution of the aerosol; and selecting a size of the conductive structure such that the electrical field has a field strength that diminishes rapidly in the flow direction away from the aerosol space;

whereby generating the voltage includes selecting the predetermined part of each first time segment and the selected frequency with reference to the amplitude of the voltage and the distance between the corona discharge component and the conductive structure, to reduce a field charging effect of the electrical field relative to a diffusion charging effect and prevent any substantial ion precipitation losses.

19. The process of claim 18 wherein:

generating the voltage further includes generating the voltage at an amplitude exceeding a corona discharge threshold during a predetermined part of each second time segment, to cause ions of a second polarity opposite the first polarity to enter the aerosol space, and selecting the predetermined part of each second time segment with reference to said amplitude and distance to reduce the field charging effect relative to the diffusion charging effect and prevent any substantial ion precipitation losses.

20. The process of claim 19 further including:

applying a voltage to the corona discharge component to bias the corona discharge component toward producing the ions of opposite polarities in equal concentrations.

21. The process of claim 20 wherein:

applying the voltage to bias the corona discharge component comprises determining and using either a mean voltage at the corona discharge component, or a charge state of the aerosol downstream of the aerosol space.

22. The process of claim 19 wherein:

each of said predetermined parts of the first and second time segments is at most twenty percent of its associated time segment.

23. The process of claim 18 wherein:

the selected frequency is at least 1,000 cycles per second.

24. The process of claim 18 wherein:

applying the first and second voltages comprises maintaining the second voltage below a corona discharge threshold, thereby to generate substantially only ions of the first polarity.

25. The process of claim 18 further including:

maintaining as substantially constant a particle concentration level of particles suspended in the aerosol while changing the electrical charge distribution, whereby a given portion of the aerosol downstream of the aerosol space includes suspended particles at a particle concentration substantially equal to an initial particle concentration of that portion upstream of the aerosol space.

26. A process for selectively charging an aerosol, including:

guiding an aerosol along a flow path to cause the aerosol to cross an aerosol space, wherein the aerosol upstream of the aerosol space includes suspended aerosol particles;

generating an alternating voltage at a selected frequency between an active electrode disposed along the flow path and a passive electrode spaced apart from and electrically isolated from the active electrode, to provide an electrical field at the aerosol space that alternates between opposite polarities at the selected frequency;

generating the alternating voltage at a magnitude sufficient to create a corona discharge at the active electrode to produce ions that enter the flow path for a merger with the aerosol particles to selectively alter an electrical charge distribution of the aerosol, while substantially maintaining a particle concentration, whereby a particle concentration level of a given portion of the aerosol downstream of the aerosol space is substantially equal to an initial particle concentration level of that portion upstream of the aerosol space.

27. The process of claim 26 wherein:

generating the alternating voltage comprises generating the alternating voltage at magnitudes that exceed corona discharge thresholds at both of said opposite polarities.

28. The process of claim 27 wherein:

generating the alternating voltage comprises applying the alternating voltage to a selected one of the active and passive electrodes, and coupling the other of said electrodes to ground through a capacitor.

29. The process of claim 28 further including:

coupling said other electrode to a biasing component selected from the group of components consisting of: constant voltage sources, and constant current sources.

30. The process of claim 29 further including:

determining a charge state of the aerosol downstream of the aerosol space, and using the charge state to regulate the biasing component.

31. The process of claim 29 further including:

using a mean voltage at said other electrode to regulate the biasing component.

32. The process of claim 26 wherein:

the alternating voltage has a sinusoidal waveform.

33. The process of claim 26 wherein:

the alternating voltage consists of alternating pulses of opposite polarities.

34. The process of claim 26 further including:

determining the selected frequency with reference to the voltage and the distance between the active and passive electrodes, to prevent any substantial loss of ions by precipitation.

35. A device for selectively charging an aerosol, including:

a conduit for guiding an aerosol along a flow path, wherein the aerosol entering the conduit includes suspended aerosol particles;

an active electrode disposed along the flow path;

a passive electrode disposed proximate the active electrode and electrically isolated from the active electrode; and circuitry for generating an alternating voltage at a selected frequency between the active and passive electrodes to produce an electrical field along the flow path that alternates between opposite polarities at the selected frequency;

wherein the alternating voltage has a magnitude sufficient to create a corona discharge at the active electrode and thus produce ions that enter the flow path for a merger with the aerosol particles to selectively alter an electrical charge distribution of the aerosol while substantially maintaining particle concentration, whereby a particle concentration level of a given portion of the aerosol downstream of the active and passive electrodes is substantially equal to an initial particle concentration level of that portion entering the conduit.

36. The device of claim 35 wherein:

the circuitry is adapted to generate the alternating voltage at magnitudes that exceed corona discharge thresholds at both of said opposite polarities.

37. The device of claim 36 wherein:

the circuitry is adapted to apply the alternating voltage to a selected one of the active and passive electrodes, and the other of said electrodes is coupled to ground.

38. The device of claim 37 wherein:

the other electrode is coupled to ground through a capacitor.

39. The device of claim 37 further including:

a biasing component coupled to the other electrode, selected from the group of biasing components consisting of: constant voltage sources, and constant current sources.

40. The device of claim 39 further including:

a regulating component for regulating the biasing component in response to measuring a charge state of the aerosol downstream of the active and passive electrodes.

41. The device of claim 35 wherein:

the circuitry is adapted to generate the alternating voltage as a sinusoidal waveform.

42. The device of claim 35 wherein:

the circuitry is adapted to generate the alternating voltage as a series of pulses of opposite polarities.

43. The device of claim 35 wherein:

the circuitry is adapted to generate the alternating voltage in a waveform selected for charging the aerosol toward a diffusion-based bipolar charge distribution.

44. The device of claim 35 wherein:

the circuitry is adapted to generate the alternating voltage in a waveform selected for charging the aerosol toward a bipolar charge distribution other than a diffusion-based bipolar charge distribution.

45. The device of claim 35 wherein:

the circuitry is adapted to generate the alternating voltage in a waveform selected for a unipolar charging of the aerosol.

46. The device of claim 35 wherein:

the selected frequency is determined with reference to the magnitude of the alternating voltage and a distance between the active and passive electrodes, whereby the electrodes and circuitry are adapted to alter the electrical charge distribution of the aerosol while avoiding any substantial loss of ions due to precipitation.

47. The device of claim 46 wherein:

the magnitude of the alternating voltage is sufficient to create a corona discharge at the active electrode only during a predetermined part of each time segment associated with each one of the opposite polarities.

48. The device of claim 47 wherein:

the predetermined part of each time segment is selected with reference to said magnitude and distance, to avoid any substantial loss of ions due to precipitation.

49. A system for characterizing aerosol particles, including:

a conduit for guiding an aerosol along a flow path, wherein the aerosol entering the conduit includes suspended aerosol particles;

an active electrode disposed along the flow path;

a passive electrode disposed proximate the active electrode and electrically isolated from the active electrode;

circuitry for generating an alternating voltage at a selected frequency between the active and passive electrodes to produce an electrical field along the flow path that alternates between opposite polarities at the selected frequency; and wherein the alternating voltage has a magnitude sufficient to create a corona discharge at the active electrode and thus produce ions that enter the flow path for a merger with the aerosol particles to selectively alter an electrical charge distribution of the aerosol thereby providing a selectively charged aerosol; and a particle characterizing instrument disposed to receive the selectively charged aerosol and adapted to separate the aerosol particles according to size, based on electrical mobility.

50. The system of claim 49 further including:

a field-controlling electrode disposed proximate and electrically isolated from the active electrode and the passive electrode, and a voltage source for biasing the field-controlling electrode to influence the electrical field between the active and passive electrodes.

51. A device for selectively charging an aerosol, including:

a conduit for guiding an aerosol along a flow path, wherein the aerosol entering the conduit includes suspended aerosol particles;

an active electrode disposed along the flow path;

a passive electrode disposed proximate the active electrode and electrically isolated from the active electrode;

circuitry for generating an alternating voltage at a selected frequency between the active and passive electrodes to produce an electrical field along the flow path that alternates between opposite polarities at the selected frequency, the circuitry being adapted to generate the alternating voltage at magnitudes that exceed positive and negative corona discharge thresholds to alternatively produce positive and negative ions at the active electrode that enter the flow path for a merger with the aerosol particles, to alter an electrical charge distribution of the aerosol; and a circuit adapted to apply a displacement voltage to a selected one of the active and passive electrodes, and further adapted for controlling the displacement voltage to adjust the concentrations at which the positive and negative ions are produced relative to each other.

52. The device of claim 51 wherein:

the circuit includes a bias source, a regulator and a variable resistor, and the bias source is selected from the group of bias sources consisting of: constant voltage sources, and constant current sources.

53. The device of claim 51 wherein:

the circuit is adapted to apply the displacement voltage to the active electrode.

* * * * *